2,976,341
Patented Mar. 21, 1961

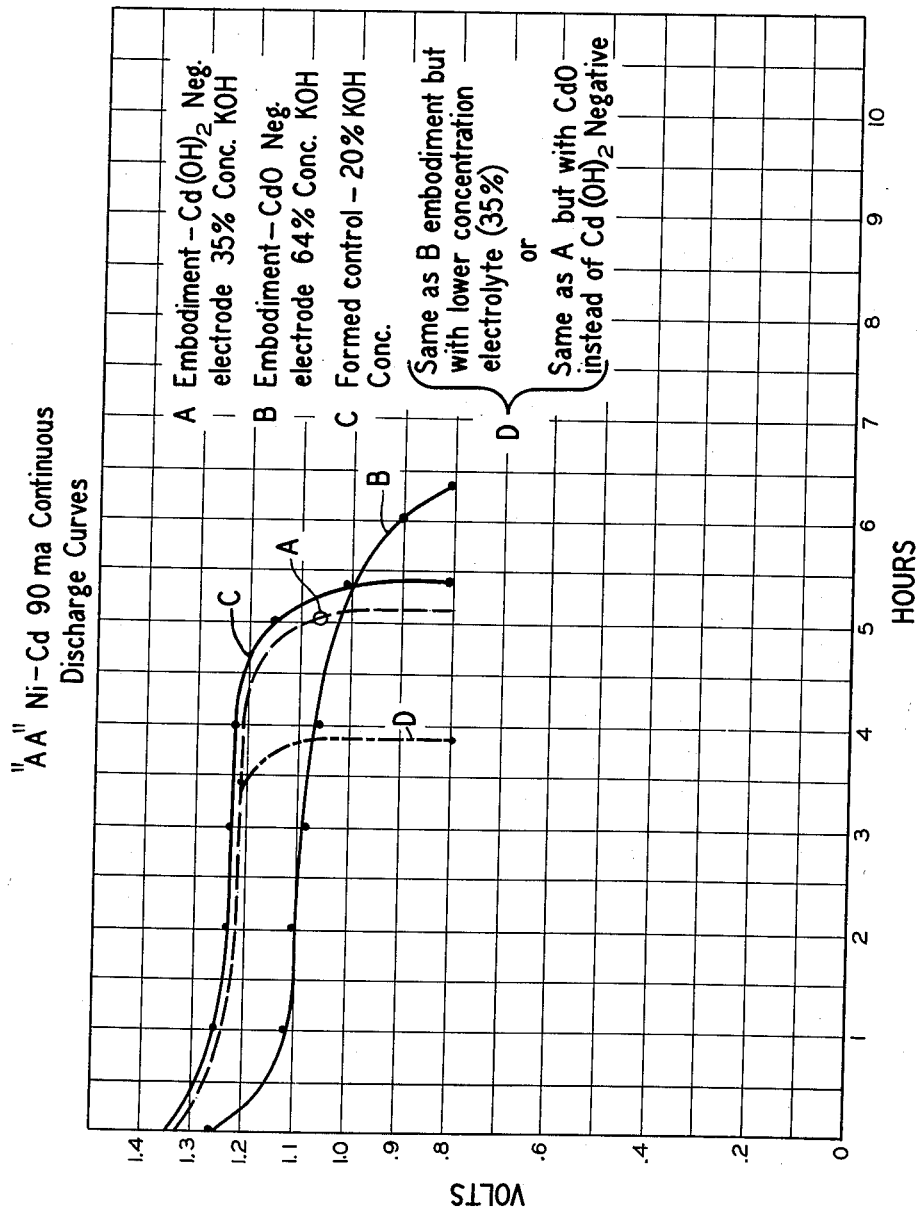

2,976,341
ELIMINATION OF FORMATION OF ALKALINE SECONDARY CELLS

John L. S. Daley, Bay Village, Ohio, assignor to Union Carbide Corporation, a corporation of New York Filed Nov. 21, 1958, Ser. No. 775,493

5 Claims. (Cl. 136—34)

This invention relates to an improved method of manufacturing alkaline secondary cells and, more particularly, the invention relates to a method of manufacturing such cells that eliminates the necessity of "cycling" the assembled cell components prior to final sealing of the cell container.

Since the earliest days of alkaline secondary cells, the necessity that the electrodes of the cell be "activated" by a "formation" process, which is exacting, time consuming, and overall, very uneconomical, has generally been a great problem.

The conventional process of formation, used in the art, ordinarily consists of alternately charging and discharging, or as it is referred to in the art, cycling the assembled cell while it is immersed in, or has access to, a reservoir containing an excess supply of electrolyte, most of which is subsequently removed from the cell. The electrolyte in the reservoir is replaced periodically during the process to keep the carbon dioxide content low. This charge-discharge process is repeated a number of times in order to place the electrodes in a condition at which the cell will operate with reasonable efficiency.

In the production of large secondary cells, formation cost is relatively minor, and in fact in certain types of cells where a relatively unlimited electrolyte supply can be contained within the cell or where the original electrolyte can be replaced with fresh electrolyte easily, the formation process need not occur until the cell is actually being used by the ultimate user of the cell. However, in secondary cells, for sealed operation, which have no easy access for changing electrolyte or where the electrolyte content of the cell must be rigidly limited, the process of formation must be carried out prior to closure of the cell container, thereby greatly complicating an otherwise simple assembly process.

The principal object of the invention is to provide an improved method of manufacturing sealed alkaline secondary cells, characterized by elimination of the necessity of the conventional type of formation prior to the sealing of such cells.

A concurrent object of the invention is to provide an improved method of manufacturing sealed alkaline secondary cells, characterized by ease and economy of manufacture.

Broadly stated, the objects of the invention are accomplished by incorporating within an alkaline secondary cell prior to sealing, a metallic oxide or hydroxide negative electrode, and a positive electrode comprising a metallic hydroxide in intimate association with an alkaline electrolyte. The total amount of electrolyte placed in the cell is equivalent to the amount required to convert the metallic oxide of the negative electrode to metallic hydroxide, if the negative electrode is initially a metallic oxide, and in either case, the amount required for efficient functioning of the cell during subsequent charging and discharging.

Alkaline cells, embodying the principles of the invention, may for example, be of the nickel-cadmium type having potassium hydroxide as the electrolyte and electrodes comprising metallic cadmium and nickelic hydroxide, which are respectively oxidized and reduced electrochemically by withdrawal of electric energy. Since these reactions are reversible the cells are of the rechargeable type. The first attempts to manufacture sealed rechargeable nickel-cadmium cells were not wholly satisfactory due to dangerous gas evolution and pressure buildup within the cells during their use. Advancements in the art have now been made which make it possible to manufacture a safe nickel-cadmium battery which avoids the above difficulties. A basic electrode capacity balance required for a safe nickel-cadmium cell is a simple matter to calculate, and therefore cells having such a balance may truly be permanently sealed. However, until the subject invention no alkaline secondary battery system had been designed which could be placed in sealed operation without prior electrolytic activation or formation.

The particular discovery that gave rise to the subject invention is that in alkaline cells, in general, the electrolyte plays two heretofore unrecognized roles in the formation and functioning of the cell elements. One is a direct entry into the charge-discharge reactions, and therefore movement of the electrolyte salt from one electrode to the other is necessary for either acceptance or delivery of energy. The other is that the electrolyte salt under certain conditions may react with the active electrode materials and become permanently and irretrievably a solid part of the electrode and can no longer be useful in its intended role as a mobile electrolyte.

In the practice of the invention, adequate pore volume must be provided within both electrodes for accommodation of the electrolyte which moves within the cell during use. Also, the incorporation of the electrolyte in the proper electrode in the cell during assembly is similarly important.

The above requirements are best explained and understood by referring to the physical-chemical reaction which takes place within the cell.

$$[2KOH+Cd]+2Ni(OH)_3 \rightleftharpoons Cd(OH)_2 + [2Ni(OH)_2+2KOH]$$

The left half of the equation represents the cell in the charged state and the right half in the discharged state. The bracketed inclusion of potassium hydroxide with one electrode or the other indicates where its location should be for the most efficient reaction.

Therefore, if the cell is assembled in the discharged condition, as is most convenient in actual practice, the positive or nickelous hydroxide electrode should contain the preponderance of potassium hydroxide electrolyte if it is to accept a charge efficiently, without gassing early in the charge.

In a conventional, safe, sealed nickel-cadmium cell, the positive electrode will gas on overcharge, but the oxygen gas will react readily at the negative electrode. However, in the discharged or near discharged cell that exists immediately after assembly, such gassing will cause a buildup of dangerously high pressures within the cell container, making venting imperative during the first few charges. For practical purposes this necessitated heretofore the use of the conventional formation process described above.

Moreover, analysis of the above operational equation discloses that if a cell is initially assembled and sealed incorrectly, that is to say, with the electrolyte in the improper electrode, it would be very difficult, subsequently, to place the cell in equilibrium. Although, the mobile fraction of the electrolyte is driven toward the positive electrode during discharge and vice versa during charge, a cell which is already discharged and has a dry positive electrode, will not function properly no matter which way it is driven. While it is true that purely physical wetting or soaking could accomplish the desired end if sufficient electrolyte is added to the cell container before sealing, the quantity of liquid electrolyte generally added to a sealed rechargeable cell is so small, and the negative electrode is so highly absorbent, the end result of even an extended soaking period will not furnish the desired wetting of the positive electrode.

Therefore, in the preferred embodiments of the invention, a molded positive electrode is provided which has been molded in such a manner that a large percentage of the required liquid electrolyte is contained therein. This positive "pellet" or "cake" is tightly compacted in the mold, for ease of handling in cell assembly operations. More importantly, because of the liquid electrolyte incorporated within the electrode, it will function without gassing through a sufficient part of its first charge cycle.

Since the electrode is tightly compacted for handling purposes, while containing only part of the ultimate or equilibrium volume of electrolyte, it is somewhat lacking in pore volume. This difficulty is overcome by using an oversized container for the cell in which the electrode is free to swell diametrically during the first discharge.

Examination of the above equation discloses that if the cell is assembled in the discharged condition the positive electrode comprises nickelous hydroxide and the negative electrode comprises cadmium hydroxide. If the cell is assembled in the charged condition the positive electrode would be of nickelic hydroxide and the negative electrode would be of cadmium metal. In either event, a suitable amount of electrolyte must be incorporated in the proper electrode to initially support the first charging or discharging reaction. This electrolyte is incorporated in the positive electrode if the cell is assembled in the discharged state and in the negative electrode if assembled in the charged state. However, in practice, as stated above, the cell is generally assembled in the discharged state for the assembly of the cell in a charged state is complicated by cadmium metal weight control difficulties, due to air oxidation of the highly porous cadmium electrode. Of course, even in construction of cells in the discharged state, care must be taken to prevent long air exposure which would bring about the conversion of the cadmium hydroxide to cadmium carbonate. Moreover, nickelous hydroxide is stable and more readily available than nickelic hydroxide.

When the cell is assembled in the discharged state the negative electrode may comprise, preferably, a porous nickel plaque having cadmium oxide or cadmium hydroxide contained within its pores, as more fully explained below. Similarly, in the practice of the invention the negative electrode may be molded from cadmium oxide, cadmium hydroxide, or mixtures of the same in conjunction with powdered nickel made from nickel carbonyl. As to molded negative electrodes, one of cadmium oxide is preferable to one of cadmium hydroxide due to its better molding properties. If in any event the negative electrode comprises cadmium oxide, this cadmium oxide must subsequently be converted to cadmium hydroxide before the negative electrode will function in a secondary cell. This conversion may be accomplished by electrolysis in a potassium hydroxide containing electrolyte. During the electrolysis potassium hydroxide is utilized as the source of hydroxyl ions giving a secondary reaction product equivalent to potassium oxide which does not re-react with water to give a return to potassium hydroxide, thus altering the composition of the electrolyte in which the conversion is accomplished.

The above conversion may be carried out within the cell after sealing, for the presence of the secondary reaction product by itself only slightly lowers the operating voltage characteristic of the cell and does not detract from its usefulness in most applications. However, if the conversion is caused to occur within a cell which initially had only a sufficient quantity of potassium hydroxide electrolyte for efficient functioning of the cell during subsequent charging and discharging, the reduction of potassium hydroxide content sustained as a result of the conversion decidedly detracts from the performance of the cell, and therefore it is necessary to initially have an amount of potassium hydroxide within the cell equal to that required for the cadmium oxide to be converted to cadmium hydroxide plus that needed for the charge-discharge reaction.

Two alkaline secondary cells, embodying the principles of the invention, were made by constructing sealed nickel-cadmium cells in the AA size; size AA being as defined in circular C466 of the National Bureau of Standards of the United States Department of Commerce. In both embodiments the positive and negative electrodes, when sealed into the cell container, were in the discharged condition. In one embodiment the negative electrode sealed into the cell consisted of cadmium hydroxide and in the other embodiment cadmium oxide. For purposes of identification, these embodiments will be called cell A and cell B respectively.

The positive electrode used in cell A was molded from a mix consisting of 70 parts by weight of powdered nickelous hydroxide, 30 parts of fine graphite powder wetted with 13.8 parts of 35 percent potassium hydroxide aqueous electrolyte. This mix was molded at a pressure of approximately 7 tons per square inch into hemicylindrical pellets weighing 2 grams each. After molding, the positive electrode comprised approximately 25 percent liquid filled voids. As mentioned above the positive electrode swelled diametrically during the first discharge until the liquid filled void volume was approximately 37 percent of the entire positive electrode mass. Two of these pellets, positioned to form a split cycinder, were placed in a cylindrically shaped retainer made of nickel wire mesh screen.

The active component of the negative electrode was cadmium hydroxide which had been converted from cadmium oxide by electrolysis in an auxiliary potassium hydroxide electrolyte bath. This electrode, which was in sheet form, consisted of a porous nickel plaque formed by a conventional sintering technique. Cadmium oxide was deposited in the pore structure of the plaque by thermal decomposition of a cadmium nitrate salt, and subsequently was converted to cadmium hydroxide as stated above. A sheet of this cadmium hydroxide filled plaque approximately .050 inch thick was rolled into a cylinder approximately ½ inch in outside diameter and 1⅞₆ inches high. This cylinder was positioned around the positive electrode assembly, described previously, and was prevented from making direct electrical contact with it by a four layer wrap of nylon cloth which served as the separator.

The positive and negative electrode assemblies with appropriate electrical connections thereto were then sealed into an AA size nickel plated drawn sheet steel cell container into which 1.35 cubic centimeters of 35 percent potassium hydroxide aqueous electrolyte had been metered. In the practice of the invention a potassium hydroxide concentration range of 20 to 35 percent is suitable.

In the cell B the positive electrode material was molded from the electrolyte moistened mix of the same composition as that used in the positive electrode of cell A. Molding pressure was also the same. The negative electrode consisted of a cadmium oxide filled sintered nickel plaque which was fabricated in exactly the same size and weight as was the negative electrode used in cell A. In this instance, however, the cadmium oxide in the plaque was not converted to cadmium hydroxide before being sealed into the cell container. In order to compensate for the loss of hydroxyl ion from the electrolyte which takes place when the cadmium oxide was subsequently converted to cadmium hydroxide, the concentration of the 1.35 cubic centimeters of 35 percent potassium hydroxide aqueous electrolyte which was added to the cell container before it was sealed, was increased to 64 percent, and in the practice of the invention a potassium hydroxide concentration range of from 55 to 64 percent is suitable. To maintain the potassium hydroxide in solution while the electrolyte was being metered into the cell, it was heated slightly.

In order to obtain a direct comparison of the performance of secondary cells of the invention with those made by the conventional procedure, cells of the same size were made wherein the active material in the negative electrode was converted from cadmium oxide to cadmium hydroxide by formation after the cell assembly was placed in the cell container, but before the cell was sealed. In this case the cell elements were continually supplied with a fresh supply of 20 percent potassium hydroxide aqueous electrolyte during the electrolytic forming. The positive electrode, which was of the same size and shape as that used in cells A and B was molded from a dry mixture of nickelous hydroxide and graphite powder. The ratio of nickelous hydroxide to graphite was the same as that used in cells A and B. After electroforming, excess electrolyte was centrifuged from the interior of the cell assembly and the cell container was sealed. This cell is designated as cell C.

Cells, designated as D, were also made in which both the positive and negative electrodes were of the same composition at the time of closing, as embodiment B, but wherein the electrolyte added to the cell before insertion of the electrodes was only 35 percent potassium hydroxide aqueous electrolyte.

Service performance of the above described sealed cells A, B, C, and D was compared quantitatively after each has been subjected to three charge-discharge cycles.

The accompanying drawing is a set of comparative discharge curves of cells A, B, C, and D.

In the drawing, a measure of the relative output capacity of these cells, after being fully charged, is shown. All four cells were discharged at a constant discharge rate of 90 milliamperes until the terminal voltage-time curve became nearly vertical.

It will be seen from the set of curves that the output capacity of the cells A and B embodying the principles of the invention wherein the step of formation was eliminated compares very favorably with that of the control cell C which was made by the conventional formation procedure. Cell A is seen to provide almost the same ampere hour output at the same terminal voltage as control cell C. Cell B provides greater ampere hour output capacity than the control cell C, but at a somewhat lower operating voltage.

Both cells A and B thus provide secondary cell service of considerable commercial value, and this is accomplished with a great reduction in manufacturing cost over that of conventional formed cells, such as cell C.

The lower output capacity obtained from cell D in comparison with cells A and B reflects the importance of providing the cell with an increased amount of electrolyte salt before sealing if the cell has a metallic oxide negative electrode, and shows the importance of using a metallic hydroxide negative electrode if the electrolyte concentration is not increased.

It is important to recognize that the aforementioned ways to eliminate formation of sealed alkaline secondary cells, apply to other systems than nickel-cadmium, including the silver-zinc, mercuric oxide-indium, magnanese dioxide-zinc and mercuric oxide-zinc systems as well as other pairings of the same compounds and elements.

What is claimed is:

1. A method of manufacturing a sealed alkaline secondary cell, which comprises intimately associating a metallic hydroxide and an alkaline electrolyte to form a positive electrode, said electrolyte being present in said positive electrode in sufficient quantity to support the initial cell reaction, incorporating said positive electrode within said cell in combination with an inorganic metallic oxygen containing compound negative electrode material, said electrodes being in the unformed condition at the time of incorporation, and additional alkaline electrolyte, the total amount of electrolyte being sufficient to sustain formation of said electrodes and subsequent cell reactions, and sealing said cell prior to the passage of an electric current therethrough.

2. The method of claim 1 wherein said inorganic metallic oxygen containing compound is a metallic oxide.

3. The method of claim 2 wherein said inorganic metallic oxygen containing compound is a metallic hydroxide.

4. The method of claim 3 wherein said positive electrode is formed by molding an electrolyte-wet metallic hydroxide mix.

5. A method of manufacturing a sealed alkaline secondary cell, which comprises molding a positive electrode from a potassium hydroxide wet powdered nickelous hydroxide and graphite mix, said electrolyte being present in said positive electrode in sufficient quantity to support the initial cell reaction, incorporating said positive electrode within said cell in combination with a cadmium hydroxide negative electrode, said electrodes being in the unformed condition at the time of incorporation, and additional alkaline electrolyte, the total amount of electrolyte being sufficient to sustain formation of said electrodes and subsequent cell reactions, and sealing said cell prior to passage of an electric current therethrough.

References Cited in the file of this patent

UNITED STATES PATENTS

| | | |
|---|---|---|
| 704,306 | Edison | July 8, 1902 |
| 2,571,927 | Neumann et al. | Oct. 16, 1951 |
| 2,646,455 | Jeannin | Oct. 23, 1951 |
| 2,739,179 | Barrett | Mar. 20, 1956 |
| 2,855,451 | Piroux | Oct. 7, 1958 |
| 2,865,974 | Scheuerle et al. | Dec. 23, 1958 |

UNITED STATES PATENT OFFICE
CERTIFICATION OF CORRECTION

Patent No. 2,976,341   March 21, 1961

John L. S. Daley

It is hereby certified that error appears in the above numbered patent requiring correction and that the said Letters Patent should read as corrected below.

Column 6, line 31, for the claim reference numeral "2" read -- 1 --.

Signed and sealed this 29th day of August 1961.

(SEAL)
Attest:

ERNEST W. SWIDER
Attesting Officer

DAVID L. LADD
Commissioner of Patents